Sept. 7, 1954　　　　　　F. MONACO　　　　　　2,688,156
METHOD OF AND APPARATUS FOR MAKING PLASTIC
ARTICLES WITH A REENTRANT FORMATION
Filed April 1, 1949　　　　　　　　　　3 Sheets-Sheet 1

INVENTOR.
FOSTER MONACO
BY
ATTORNEY

Sept. 7, 1954  F. MONACO  2,688,156
METHOD OF AND APPARATUS FOR MAKING PLASTIC
ARTICLES WITH A REENTRANT FORMATION
Filed April 1, 1949  3 Sheets-Sheet 2

INVENTOR.
FOSTER MONACO
BY
ATTORNEY

Sept. 7, 1954　　　　　　F. MONACO　　　　　　2,688,156
METHOD OF AND APPARATUS FOR MAKING PLASTIC
ARTICLES WITH A REENTRANT FORMATION
Filed April 1, 1949　　　　　　　　　　　　3 Sheets-Sheet 3
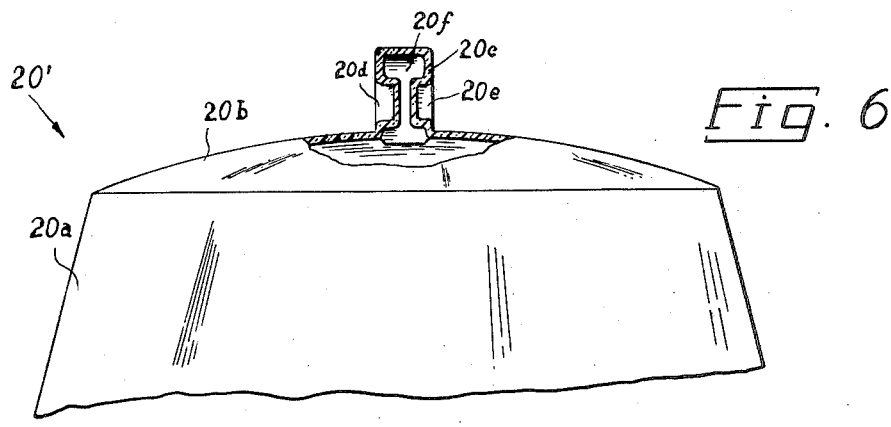
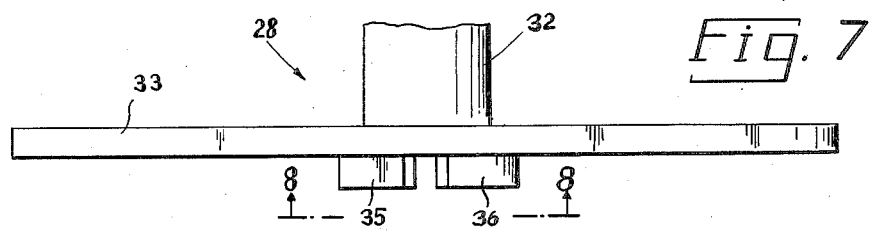
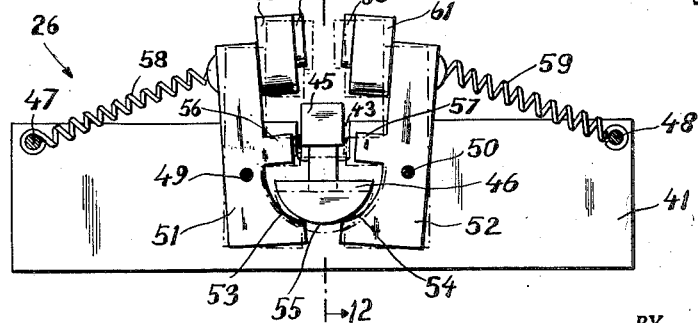
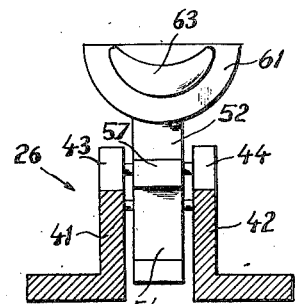
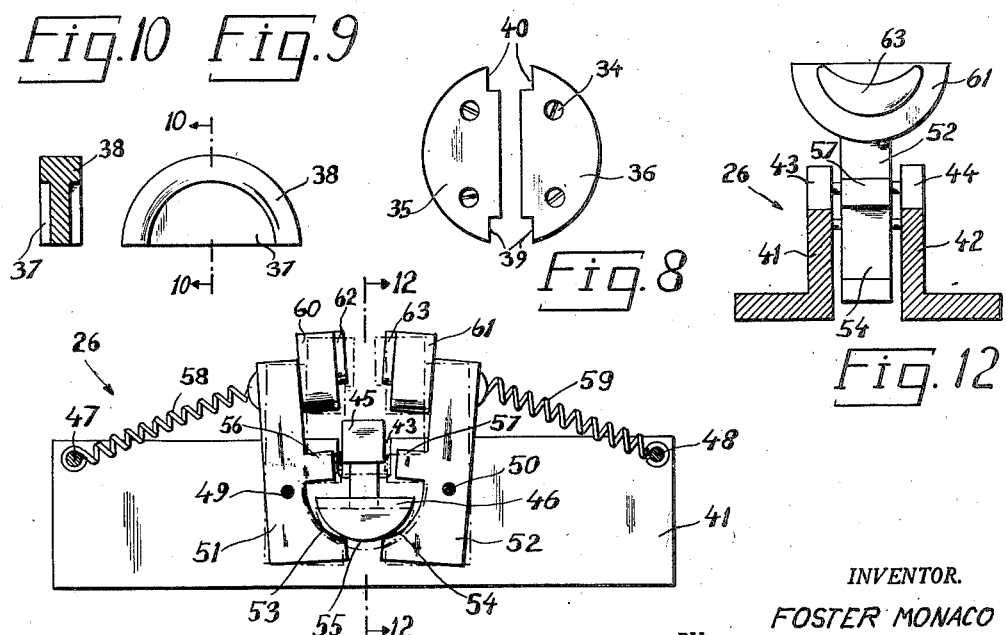
INVENTOR.
FOSTER MONACO
BY
ATTORNEY Patented Sept. 7, 1954

2,688,156

UNITED STATES PATENT OFFICE 2,688,156

METHOD OF AND APPARATUS FOR MAKING PLASTIC ARTICLES WITH A REENTRANT FORMATION

Foster Monaco, Jackson Heights, N. Y.

Application April 1, 1949, Serial No. 84,848

10 Claims. (Cl. 18—19)

The present invention relates to plastic articles having a re-entrant formation, and to an apparatus for making such articles.

More particularly, the invention has reference to plastic articles of the type which are made from a relatively thin sheet of thermoplastic material by deforming the sheet in its heated condition, through the use of vacuum and/or pressure, into a suitable concavo-convex shape; covers, casings and other receptacles may be made in this manner.

Heretofore, so far as I am aware, it had not been found practicable to provide for re-entrant formations, such as pinched handles and the like, in articles of the above description and it has, therefore, been necessary to affix supplementary attachments such as separate knobs to these articles for the purpose of facilitating their handling. The provision of these attachments not only detracted from the uniform appearance of these articles and caused breakage of the cover where attached, but also called for separate assembling operations, made the manufacturer dependent on outside suppliers and, in general, increased the cost of production.

It is, therefore, an object of the present invention to provide an improved article of the character described, provided with an integral re-entrant formation constituting a handle or the like.

A more specific object of this invention is to provide a shell of plastic material, forming a cover or receptacle, provided with a pinched handle integrally extending therefrom.

Another object of my invention is to provide, in an apparatus for making an article of the character described, means for producing a re-entrant formation on said article.

A further object of the invention is to provide an apparatus of the foregoing description in which the deformation of a sheet into concavo-convex shape, the formation of an integral projection thereon and the pinching of this projection to produce an easily grippable handle or the like take place in a single operation.

A still further object is to provide a method of making articles of the character described.

The above and other objects and features of the invention will become apparent from the following description of a now preferred embodiment of an apparatus according to the invention, reference being had to the accompanying drawing in which:

Fig. 6 is a fragmentary view of the finished product after the final step, partly in section and taken at right angles to Fig. 5;

Fig. 7 is a fragmentary view, on a large scale, of the plunger of the apparatus;

Fig. 8 is a view taken on the line 8—8 of Fig. 7;

Fig. 9 is an elevational view of a detail;

Fig. 10 is a section taken on the line 10—10 of Fig. 9;

Fig. 11 is an enlarged sectional view taken on the line 11—11 of Fig. 2; and

Fig. 12 is a section taken on the line 12—12 of Fig. 11.

Figure 1:
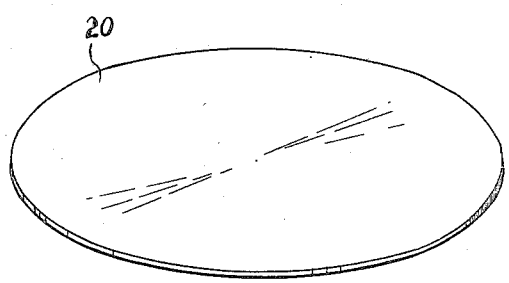
Fig. 1 is a perspective view of the sheet from which the article is to be made.

The starting material used in the manufacturing process about to be described is a disk 20 (Fig. 1) of plastic material, preferably transparent, for example cellulose acetate or one of its homologues. Suitable materials of this character are available on the market under trade names such as Lucite and Plexiglas, although the invention is in no way limited to any particular material.

Figure 4:
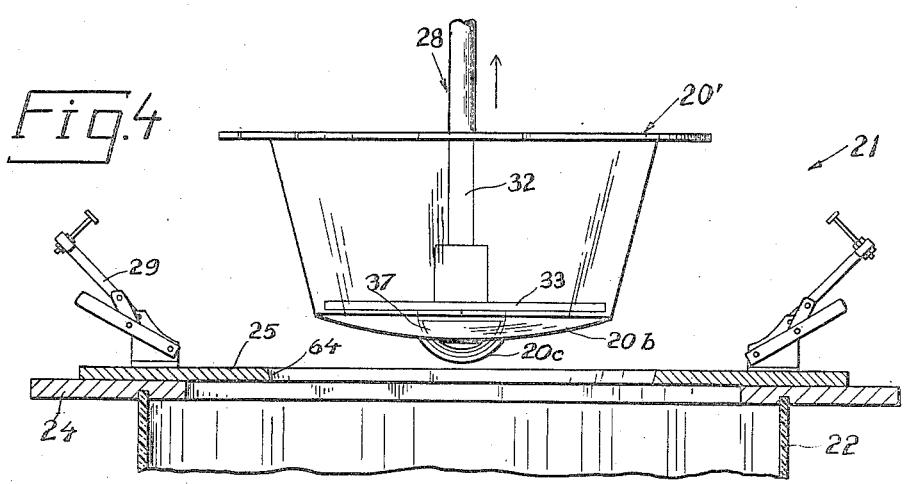
Fig. 4 is a fragmentary view similar to Fig. 2, taken at a still later stage of operation.
Figure 2:
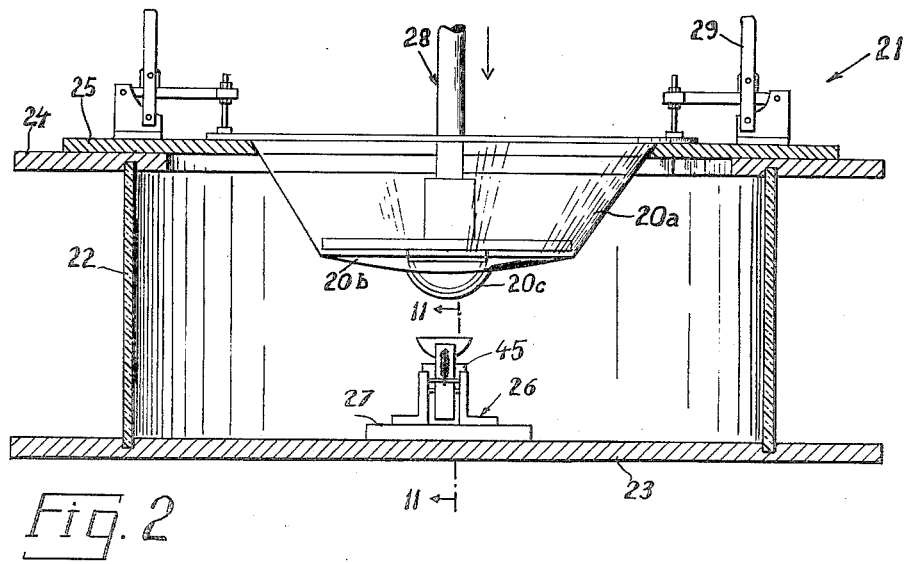
Figs. 2 and 3 are sectional elevations of the essential parts of an apparatus according to the invention, the two figures being taken at right angles to each other and at successive stages of operation.
Figure 3:
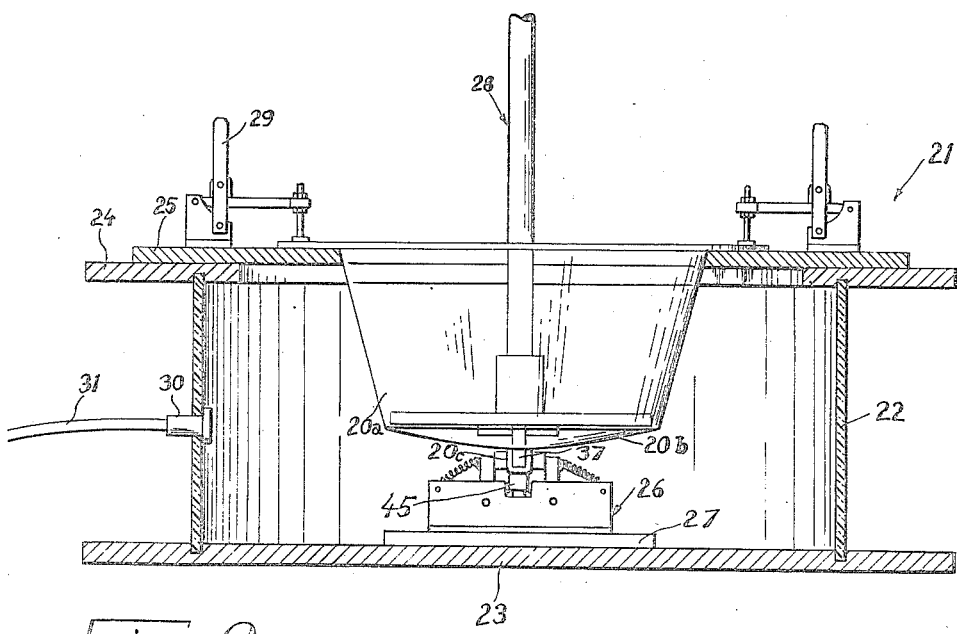

The apparatus 21, Figs. 2, 3 and 4, essentially comprises a vacuum cylinder 22, preferably of plastic, rising from a base 23; a flange 24 at the top of the cylinder 22, this flange in turn carrying an annular support 25 for the disk 20; a jig 26, centrally disposed at the bottom of the cylinder on a suitable mount 27; a plunger, generally indicated at 28, which is vertically displaceable in the cylinder 22 and removable therefrom by suitable mechanism, not shown; a set of quick-acting clamps 29 (only two shown in each figure), rising from the ring or support 25 for securing the disk 20 thereto; and a nipple 30 for connecting the interior of the cylinder to a source of vacuum, not shown, by way of a tube 31.

As best shown in Fig. 7, the plunger 28 comprises a shaft 32 provided at its lower end with a metal disk or head 33. Secured to the underside of this disk, by means of screws 34 (Fig. 8), are a pair of shoes 35, 36 adapted frictionally to engage between them an insert 37, shown separately in Figs. 9 and 10. The insert 37 is formed with a raised rim 38, the shoes 35, 36 being recessed at 39, 40 to accommodate this rim.

The jig 26 is best shown in Figs. 11 and 12 and comprises a pair of L-shaped brackets 41, 42 each having a recess 43, 44 adapted to accommodate a cross bar 45 of a cam member 46. The brackets 41, 42 are interconnected by pins 47, 48 and 49, 50, the latter two forming respective pivots for a pair of jaws 51, 52 having curved lower surfaces 53, 54 designed to co-operate with the arcuate surface 55 of cam member 46. The jaws also have projections 56, 57 which abut the cross bar 45 when these members, in the manner subsequently described, are brought into the position shown in dot-dash lines in Fig. 11. A pair of helical springs 58, 59, respectively anchored to the pins 47, 48, tend to move the projections 56, 57 away from the member 46.

Secured to the top of each jaw member 51, 52 is a segmental element 60, 61, respectively, generally similar to the insert 37 but complementary thereto. Instead of a raised rim, therefore, these segments are provided with a peripheral depression formed by a generally crescent-shaped projection 62, 63, respectively. The inner radius of rim 38 exceeds the outer radius of projections 62, 63 by substantially the thickness of the plastic sheet forming the disk 20; the reason for this will be subsequently apparent.

The operation of the apparatus just described will now be explained.

The disk 20 is heated and placed on the annular support 25, being secured in position thereon by bringing the clamps 29 from the open position shown in Fig. 4 into the closed position shown in Figs. 2 and 3. A partial vacuum is then created inside the cylinder 22, by withdrawing the air therefrom through the tube 31, and the plunger 28 simultaneously descends as indicated by the arrow in Fig. 2. The center portion of the heated disk 20 is thereby drawn through the circular opening 64 of the ring 25 which may be suitably beveled as best seen in Fig. 4.

Figure 5:
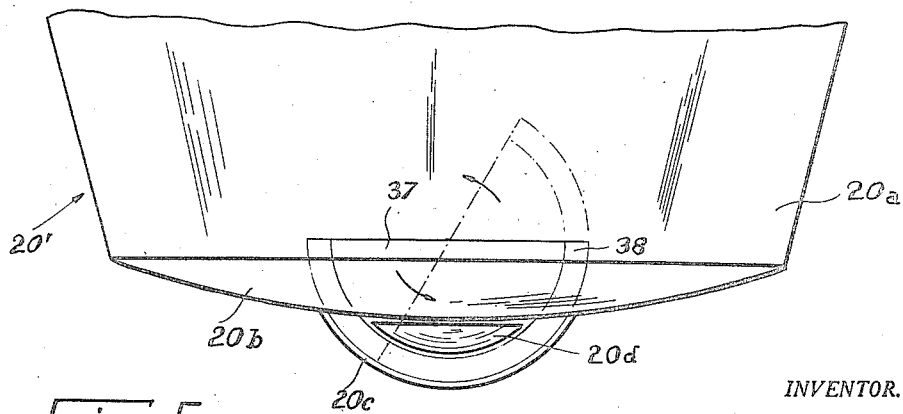
Fig. 5 is a fragmentary view of the finished product on a larger scale, showing the final operational step.

The effect of the vacuum created inside the cylinder 22 is to draw the center portion 20a of the disk 20 into the shape of a frusto-cone capped by a curved portion 20b, the diameter of the latter portion being determined by the diameter of the metal disk 33 of plunger 28. The insert 37, which at this stage is frictionally held between the shoes 35, 36 of the plunger, causes the forming of a projection 20c extending downwards from the center of portion 20b, this projection representing the handle of the finished article indicated at 20' in Figs. 4, 5 and 6. So far, the handle lacks the re-entrant formation which alone insures convenient and secure grasping thereof by the fingers of the user and which is the principal characteristic of an article according to the invention. The final shaping of the handle, to produce the desired formation, is accomplished by the co-operation of the insert 37 with the elements 60, 61 in the following manner:

When the plunger 28 reaches its bottom position shown in Fig. 3, the insert 37 through the intermediary of handle portion 20c bears upon the cross bar 45, thereby depressing the member 46 and causing the curved surface 55 thereof to cam aside the co-operating surfaces 53, 54 of jaws 51, 52. These jaws, therefore, rotate about their pivots 49, 50 against the tension of springs 58, 59 until they assume the position illustrated in dot-dash lines in Fig. 11, further rotation being then prevented by the projections 56, 57 abutting the cross bar 45. At the same time the crescent-shaped projections 62, 63 are forced laterally against the sides of the handle portion 20c, thereby producing depressions 20d, 20e (Fig. 6) therein which conform to the shape of these projections. Owing to the presence of insert 37 inside the portion 20c, a channel 20f will remain inside the handle which, accordingly, will assume the general cross section of the insert as will be apparent upon comparing Figs. 6 and 10.

After the operation illustrated in Fig. 3 has been completed, air is re-admitted into the cylinder 22 and the clamps 29 are opened, as shown in Fig. 4, whereupon the article 20' may be withdrawn with the plunger as indicated by the arrow in Fig. 4. When the article has cooled, it may be easily detached from the plunger by exerting sufficient pull to overcome the frictional engagement of the insert 37 by the shoes 35, 36. Alternatively, the plunger may be withdrawn while the article is still held by vacuum and by the clamps 29, after which the article itself may be lifted from the cylinder into which air has been re-admitted.

In either case there still remains the problem of removing the insert 37 from the finished article. According to an important feature of the present invention, this problem is solved by manipulating the insert 37 in such manner that it will rotate about its center, its rim 38 being guided by the widened peripheral portion of the channel 20f. This is clearly shown in Fig. 5 in which this rotation is indicated by the arrows, the member 37 being illustrated in dot-dash lines in an intermediary position prior to its complete removal from the article 20'.

It will thus be understood that the invention also provides a method of making an article of the character described by forming a projection around an arcuate insert (the rim 38 of member 37), pinching the projection intermediate the insert and its center (at 20d, 20e), whereby an arcuate channel substantially conforming to the shape of the insert is formed in the projection, and removing the insert from the channel by rotating the insert about its center.

The finished article 20' may serve as a display cover for pastries or the like, yet the invention is not limited to articles of this description but is, on the contrary, capable of numerous modifications and adaptations without exceeding its scope as defined in the appended claims.

I claim:

1. A method of making a thin-walled plastic article having an integral projection with a re-entrant formation which comprises the steps of forming a projection in a wall of said article around an arcuate insert, pinching said projection intermediate the periphery of said insert and the center of curvature of said insert, whereby an arcuate channel substantially conforming to the shape of said insert is formed in said projection, and removing said insert from said channel by rotating said insert about said center.

2. A method of making a thin-walled thermoplastic article having an integral projection with a re-entrant formation which comprises the steps of heating a portion of the wall of said article, forming a projection in said portion around an arcuate insert, pinching said projection intermediate the periphery of said insert and the center of curvature of said insert, whereby an arcuate channel substantially conforming to the shape of said insert is formed in said projection, allowing said wall portion to cool, and removing said insert from said channel by rotating said insert about said center.

3. A method of making a thin-walled plastic article having an integral handle which comprises the steps of forming a projection in a wall of said article around an arcuate insert, pinching said projection on opposite sides intermediate the periphery of said insert and the center of curvature of said insert, whereby an arcuate channel substantially conforming to the shape of said insert is formed in said projection, and removing said insert from said channel by rotating said insert about said center.

4. A method of making a thin-walled thermoplastic article having an integral handle which comprises the steps of heating a portion of the wall of said article, forming a projection in said portion around an arcuate insert, pinching said projection on opposite sides intermediate the periphery of said insert and the center of curvature of said insert, whereby an arcuate channel substantially conforming to the shape of said insert is formed in said projection, and removing said insert from said channel by rotating said insert about said center.

5. In an apparatus for making a thin-walled plastic article, the combination, with fastening means for holding a sheet of plastic material and plunger means forming a convexity in said sheet, of a pair of jaws adapted to co-operate with said plunger means for making a lateral depression in said convexity, and cam means positioned for actuation by said plunger means, through the intermediary of said sheet, for operating said jaws.

6. The combination according to claim 5 wherein said plunger means comprises a pressure member having an arcuate projection and said jaws are provided with co-operating elements having depressions substantially complementary to said arcuate projection.

7. The combination according to claim 6 wherein said plunger means further comprises a head holding said pressure member by frictional engagement only, said pressure member operating said cam means through said sheet.

8. An apparatus for making a plastic article having a re-entrant formation, comprising fastening means for holding a sheet of plastic material, a plunger displaceable perpendicular to said sheet, said plunger being provided with a detachable member of segmental configuration having opposed lateral faces a rim raised with respect to said faces, means including said plunger for deforming a portion of said sheet into concavo-convex shape, said segmental member being adapted to form a projection in said portion, a pair of movable jaws positioned to receive said projection between them, said jaws respectively carrying a pair of cooperating elements having arcuate depressions substantially complementary to said raised rim, and mechanism for moving said jaws toward each other in such manner as to force said co-operating elements to bear upon said projection and against said member, thereby forming lateral depressions in the surface of said projection and a channel inside said projection from which said member may be removed by rotation about its own center of curvature.

9. An apparatus according to claim 8 wherein said mechanism comprises a cam member for displacing said jaws, said cam member being positioned for actuation by said segmental member through the intermediary of said projection.

10. An apparatus according to claim 9 wherein said mechanism further comprises spring means for restoring said jaws and said cam member to a normal position upon removal of said projection.

References Cited in the file of this patent

UNITED STATES PATENTS

| Number | Name | Date |
| --- | --- | --- |
| 548,895 | Staples | Oct. 29, 1895 |
| 900,276 | Geffers | Oct. 6, 1908 |
| 1,308,330 | Brown | July 1, 1919 |
| 1,449,808 | Boals | Mar. 27, 1923 |
| 1,593,614 | Zeiler | July 27, 1926 |
| 1,776,813 | Luchs | Sept. 30, 1930 |
| 1,776,888 | Clark | Sept. 30, 1930 |
| 1,823,961 | Vogelsang | Sept. 22, 1931 |
| 1,929,139 | Eisenhauer | Oct. 3, 1932 |
| 2,265,111 | Brown | Dec. 2, 1941 |
| 2,336,864 | Holmes | Dec. 14, 1943 |
| 2,442,338 | Borkland | June 1, 1948 |